Jan. 18, 1966 R. L. LESSLEY 3,229,579
SOLAR ENERGY COLLECTOR
Filed Dec. 27, 1961

INVENTOR.
ROBERT L. LESSLEY
BY
ATTORNEY

United States Patent Office 3,229,579
Patented Jan. 18, 1966

3,229,579
SOLAR ENERGY COLLECTOR
Robert L. Lessley, Pomona, Calif., assignor to Aerojet-General Corporation, Azusa, Calif., a corporation of California
Filed Dec. 27, 1961, Ser. No. 162,524
6 Claims. (Cl. 88—85)

This invention relates to a solar energy collector and in particular to a collector which may be advantageously employed in space vehicles.

Heretofore, solar energy collectors have consisted of a single reflector having a parabolic surface which surface must be very accurately shaped to efficiently reflect solar energy to a focal point. However, in order to construct a reflector having an accurate parabolic surface thereon it has been necessary to use an amount of reinforcing structure which adds an undesirable weight to the reflector if it is to be used in a space vehicle. Moreover, parabolic reflectors used in space vehicles have been found difficult to control when the reflector is located a considerable distance from the axis of the vehicle. It is therefore the primary object of the invention to provide a solar energy collector which is lighter and easier to control in a space vehicle than the conventional parabolic reflector.

Another object of the invention is to provide a solar energy collector utilizing a double reflector system consisting of a relatively large frusto conical surface and a relatively small parabolic surface.

Still another object of the invention is to provide a solar energy collector utilizing a double reflector system wherein one of the reflectors is larger than the other and is formed of a pair of inflatable tori and a flexible metallic foil or metal coated plastic film stretched between the tori which permits the reflector to be collapsed when not in use.

Other objects and advantages of the invention will become apparent from the following description in connection with the accompanying drawings wherein.

Figure 1:
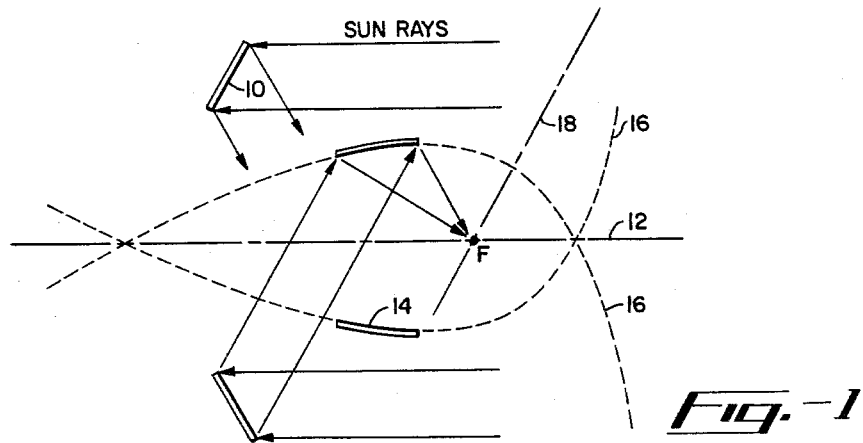
FIGURE 1 is a diagrammatic view of a frusto conical reflecting surface and a parabolic reflecting surface formed by the surface of revolution of a parabola shown in dotted lines.
Figure 2:
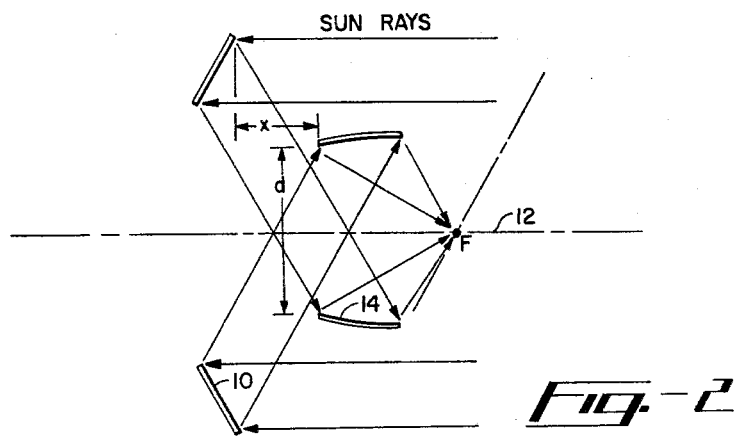
FIGURE 2 is a diagrammatic view of a frusto conical reflecting surface and a parabolic reflecting surface showing their relative positions in relation to the path of the sun rays reflected therebetween.

The invention can be best understood by examining the geometry of the double reflecting surfaces of the solar energy collector as illustrated in FIGURES 1 and 2. In FIGURE 1 there is seen an annular frusto conical reflecting surface 10 against which parallel rays from the sun reflect and travel radially inwardly toward the axis or centerline 12 of the frusto conical surface. These rays do not focus at a point as would occur with a parabolic surface but instead focus on a line, the centerline 12. It is therefore necessary to use some type of a parabolic surface to further focus the sun rays from what is essentially a line pattern to a focal point. A parabolic reflecting surface designed to perform this function is indicated by numeral 14 and is part of the surface of revolution of a parabola shown in dotted lines at 16. It is seen that parabola 16 has an axis 18 which is slanted with respect to the centerline or axis 12 of frusto conical reflecting surface 10 and the two axes 12 and 18 intersect at the focal point F of the parabola. In this position the parabola 16 is rotated about the centerline 12 of the frusto conical reflecting surface thereby forming a parabolic surface 14 which will reflect sun rays from frusto conical surface 10 to the focal point F.

In order for the parabolic reflecting surface 14 to reflect all the sun rays reflected from the frusto conical reflecting surface 10, the diameter of that portion of the parabolic surface nearest the frusto conical surface 10 should be no less than the distance indicated by $d$ in FIGURE 2. It can be seen that distance $d$ is the diameter of the largest circle defined by the intersection of sun rays reflected from the frusto conical reflecting surface 10. If the diameter of the parabolic surface were less than $d$ it can be readily appreciated that not all the sun rays reflected from the frusto conical reflecting surface 10 would fall on the parabolic surface 14. It is further desirable in order for parabolic surface 14 to receive all the sun rays reflected from surface 10 that that portion of the parabolic surface 14 nearest the frusto conical surface 10 be spaced therefrom a distance no less than the distance indicated by $x$ in FIGURE 2. This is the distance between the frusto conical reflecting surface 10 and the circle defined by the intersection of the sun rays reflected from surface 10 and having the diameter designated by $d$. If the parabolic surface 14 were any closer than distance $x$ to the frusto conical surface 10 some of the sun rays reflected from surface 10 would be prevented from hitting the interior surface 14 of the parabolic surface of revolution and, therefore, would not reach focal point F.

Figure 3:
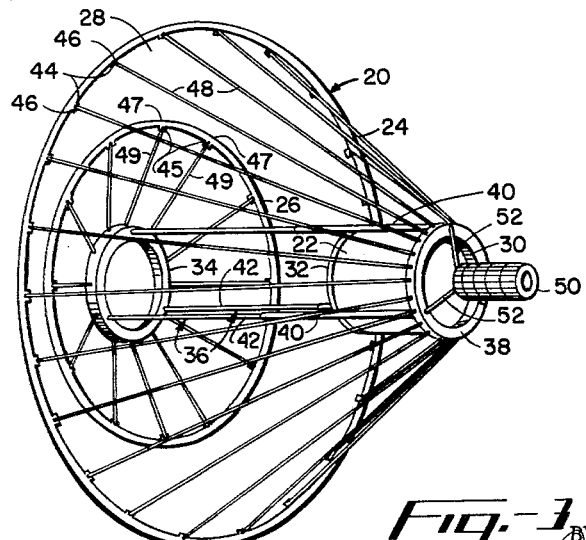
FIGURE 3 is a perspective view of a solar energy collector embodying the double reflecting surfaces shown in FIGURES 1 and 2.

The double reflector geometry hereinabove described may be employed in a solar energy collector as shown in FIGURE 3. The collector consists of a frusto conical reflector ring generally designated at 20 and a hollow member 22 concentric with the ring 20 and axially spaced a distance therefrom equal to distance $x$ defined hereinabove.

The frusto conical reflector ring 20 is constructed of a pair of annular ring members 24 and 26 which may be in the form of inflatable rubber or plastic tori. One torus or ring member 24 has a diameter greater than that of the other torus 26 and is axially spaced therefrom. Tightly stretched between the tori 24 and 26 is a flexible metallic foil 28 which may be attached to the tori by any suitable fastening means. The foil 28 could also be in the form of a coated plastic film. Due to the relative size and position of tori 24 and 26 it can be readily seen that the stretched metallic foil 28 will attain a frusto conical shape and will provide an internally oriented annular frusto conical reflecting surface for reflecting sun rays radially inwardly to the axis of the two tori.

Since the annular rings or tori 24 and 26 are inflatable and the foil 28 is flexible, the entire fusto conical ring 20 may be collapsed and stored in a small area in that condition. When it is desired to operate the solar energy collector it is merely necessary to inflate the tori by any suitable inflation device. The frusto conical ring 20 is also extremely light and does not require the amount of reinforcing structure to accurately hold its shape as is required in a parabolic reflector. Therefore a relatively large fusto conical ring is provided which is somewhat lighter than parabolic reflectors now in use and which has the additional property of being easier to control to reflect sun rays than parabolic reflectors.

Hollow member 22 is also constructed of a light weight material and has on its inside a parabolic reflecting surface 30 for reflecting sun rays from the frusto conical reflector 20 to a single focal point. The hollow member 22 may be relatively small in comparison to the frusto conical reflector 20 and due to its small size the weight of the structure forming the hollow member necessary to provide an accurate parabolic surface thereon will not be excessive. In fact, the combined weight of the large frusto conical reflector 20 and hollow member 22 will be somewhat less than that of an accurate parabolic reflector constructed so as to have an equivalent solar energy collecting capacity.

The open end 32 of the hollow member 22 is preferably spaced a distance $x$ from the frusto conical ring 20 and has a diameter $d$, see FIGURES 1 and 2, thus permitting the maximum amount of sun rays to fall on the parabolic surface 30.

In order to mount the hollow member 22 in proper relation to the frusto conical reflector 20 I have provided a structure which is extremely lightweight and permits the inflatable tori 24 and 26 and the flexible foil 28 to be collapsed for compactness. This structure includes an annular mounting ring 34 concentric with the frusto conical ring 20 and a plurality of rigid elongated supporting members, generally designated by numeral 36. The supporting members 36 are fixed at one end to ring 34 by welding or any other suitable means and extend through the opening in ring 20 to the hollow member 22 and are fixed to a shoulder 38 on one end of member 22. The supporting members 36 may be one piece tubular members, or, as shown in FIGURE 3, may constitute two telescopically mounted tubular members 40 and 42. This telescopic mounting arrangement permits the hollow member 22 to be selectively positioned axially relative to the mounting ring 34 and the frusto conical reflector 20. Set screws, not shown, may be provided through the larger tube 40 for securing the other tube 42 against axial movement once the entire solar energy collector is assembled.

On the inner circumference of each of the tori 24 and 26 are a plurality of spaced tabs 44 and 45, respectively, having openings 46 and 47 therein. A set of equal length flexible guy wires or strands 48 are either tied to the tabs 44 on the larger torus 24 or are fixed thereto by any other suitable means and extend to shoulder 38 on hollow member 22 to which they are fixed. A second set of equal length strands 49 are fixed to the tabs 45 on the smaller torus 26 and extend therefrom to mounting ring 34 and are fixed to it. It can be seen that when the mounting ring 34 and hollow member 22 are sufficiently spaced apart to put strands 48 and 49 under tension, the strands will constitute stabilizing or guide members for axially and concentrically positioning mounting ring 34 and hollow member 22 with respect to the frusto conical reflector 20. It is, of course, understood that the length of strands 48 must be such as to space hollow member 22, and thus the parabolic reflecting surface 30 thereon, a distance equal to X from frusto conical ring 20.

Any suitable thermoelectric converter 50 is mounted on the hollow member 22 by means of radial bars 52 which locate the converter concentrically with member 22 and at the focal point F of the parabolic reflecting surface 30. A solar boiler could be used in place of the thermoelectric converter 50 in this structure such as disclosed in copending application Serial No. 162,505, filed December 27, 1961, now abandoned. The converter will convert the solar energy reflected through the double reflector system of the solar energy collector into electrical energy to power electrical instruments or the like in space vehicles or for any other power applications.

It will, of course be understood that various changes can be made in the form, details, arrangements and proportions of the various parts without departing from the spirit and scope of the invention as defined by the following claims.

I claim:

1. A solar energy collector comprising an internally oriented annular frusto conical reflecting surface having a central axis and adapted to be exposed to sun rays for reflecting light rays radially inwardly of said annular frusto conical reflecting surface, a hollow member concentric with said annular frusto conical reflecting surface and having at least one open end, means mounting said one open end of said hollow member in proximal relation to the end of said annular frusto conical reflecting surface having the largest diameter so as to be exposed to light rays reflected radially inwardly from said annular frusto conical reflecting surface, a parabolic reflecting surface on the inside of said hollow member against which light rays reflected radially inwardly from said annular frusto conical reflecting surface and entering through said one open end of said hollow member are adapted to be directed for reflection therefrom, said parabolic reflecting surface being defined by the surface of revolution of a portion of a parabola rotated about the central axis of said annular frusto conical reflecting surface and having its own axis at an angle to the central axis of said annular frusto conical reflecting surface, with said axes intersecting at the focal point of said parabola where the reflected light rays from said parabolic reflecting surface are adapted to be concentrated.

2. A solar energy collector comprising an annular member provided with an internally oriented annular frusto conical reflecting surface having a central axis and adapted to be exposed to sun rays for reflecting light rays radially inwardly of said annular frusto conical reflecting surface, a hollow member, means mounting said hollow member concentrically with said annular member and axially spaced therefrom in proximal relation to the end of said annular frusto conical reflecting surface having the largest diameter, said hollow member having opposite open ends and an internal parabolic reflecting surface for reflecting light rays reflected from said annular frusto conical reflecting surface, said parabolic reflecting surface being defined by the surface of revolution of a portion of a parabola rotated about the central axis of said annular frusto conical reflecting surface and having its own axis at an angle to the central axis of said annular frusto conical reflecting surface, with said axes intersecting at the focal point of said parabola where the reflected light rays from said parabolic reflecting surface are adapted to be concentrated, the open end of said hollow member adjacent said annular member having a diameter at least equal to the diameter of the largest circle defined by the intersection of light rays reflected from said annular frusto conical reflecting surface, and said mounting means axially spacing said latter open end of said hollow member from said annular member a distance at least equal to the distance between the end of said annular frusto conical reflecting surface having the largest diameter and the largest circle defined by the intersection of light rays reflected from said annular frusto conical reflecting surface.

3. A solar energy collector as set forth in claim 2, wherein said focal point where the reflected light rays from said parabolic reflecting surface are adapted to be concentrated is disposed outwardly of said hollow member at the end thereof remote from said annular member.

4. A solar energy collector comprising an annular member provided with an internally oriented annular frusto conical reflecting surface having a central axis and adapted to be exposed to sun rays for reflecting light rays radially inwardly of said annular frusto conical reflecting surface, a hollow member concentric with said annular member and disposed on one side thereof in proximal relation to the end of said annular frusto conical reflecting surface having the largest diameter, a mounting member on the other side of said annular member and concentric therewith, at least one relatively rigid elongated supporting member connected at one end to said hollow member and at its other end to said mounting member, said relatively rigid elongated supporting member extending through the opening defined by said annular member, a plurality of relatively flexible stabilizing members respectively connecting said hollow member and said mounting member to said annular member, said hollow member having at least one open end, said one open end of said hollow member being located in proximal relation to the end of said annular frusto conical reflecting surface having the largest diameter so as to be exposed to light rays reflected radially inwardly from said annular frusto conical reflecting surface, a parabolic reflecting surface on the inside of said hollow member against which light rays reflected radially inwardly from said annular frusto conical reflecting surface and entering through said one open end of said hollow member are adapted to be directed for reflection therefrom, said hollow member being axially spaced from the end of said annular frusto conical reflecting surface having the largest diameter, and said relatively flexible stabilizing members and said relatively rigid elongated supported member axially positioning said hollow member with respect to said annular member and the internal annular frusto conical reflecting surface thereon so that said parabolic reflecting surface is disposed in the path of light rays reflected radially inwardly from said annular frusto conical reflecting surface for further reflection of light rays to a focal point.

5. A solar energy collector comprising a pair of inflatable tori, said tori being concentric with one another, one of said tori having a diameter greater than that of the other of said tori and axially spaced therefrom, a flexible metallic foil ring stretched between said axially spaced tori forming an internally oriented annular frusto conical reflecting surface having a central axis and adapted to be exposed to sun rays for reflecting light rays radially inwardly of said annular frusto conical reflecting surface, a mounting member concentric with said pair of tori and positioned on the side thereof nearest the other of said tori having the smaller diameter, a hollow member concentric with said pair of tori and positioned on the side thereof nearest said one of said tori having the greater diameter, a plurality of relatively rigid elongated supporting members connected at one end to said hollow member and at the other end to said mounting member, said relatively rigid elongated supporting members extending through the respective openings defined by the pair of tori, a first set of relatively flexible stabilizing members connecting said hollow member and said one of said tori having the greater diameter, a second set of relatively flexible stabilizing members connecting said mounting member and the other of said tori having the smaller diameter, said hollow member having at least one open end, said one open end of said hollow member being located in proximal relation to the end of said annular frusto conical reflecting surface having the largest diameter so as to be exposed to light rays reflected radially inwardly from said annular frusto conical reflecting surface, a parabolic reflecting surface on the inside of said hollow member against which light rays reflected radially inwardly from said annular frusto conical reflecting surface and entering through said one open end of said hollow member are adapted to be directed for reflection therefrom, said hollow member being axially spaced from the end of said annular frusto conical reflecting surface having the largest diameter, and said relatively flexible stabilizing members and said relatively rigid elongated supporting members axially positioning said hollow member with respect to the internal annular frusto conical reflecting surface formed by said metallic foil ring so that said parabolic reflecting surface is disposed in the path of light rays reflected radially inwardly from said annular frusto conical reflecting surface.

6. A solar energy collector as set forth in claim 5, wherein said parabolic reflecting surface is provided with a focal point where the reflected light rays from said parabolic reflecting surface are adapted to be concentrated, said focal point of said parabolic reflecting surface lying on the central axis of said annular frusto conical reflecting surface and disposed outwardly of said hollow member at the end thereof remote from said annular frusto conical reflecting surface, a thermoelectric converter at said focal point, and means mounting said thermoelectric converter on said hollow member.

References Cited by the Examiner

UNITED STATES PATENTS

| | | | |
|---|---|---|---|
| Re. 25,242 | 9/1962 | Toulmin. | |
| 804,996 | 11/1905 | Anthony | 88—57 |
| 1,469,690 | 10/1923 | Smith | 240—41.1 |
| 2,072,262 | 3/1937 | Herzog et al. | |
| 2,189,843 | 2/1940 | Soller. | |
| 2,457,253 | 12/1948 | Martin | 88—73 X |
| 2,534,543 | 12/1950 | Bullock. | |
| 2,859,745 | 11/1958 | Brudersdorff | 88—73 X |
| 2,945,234 | 7/1960 | Driscoll. | |
| 3,052,229 | 9/1962 | Wenger. | |
| 3,054,328 | 9/1962 | Rodgers | 88—73 |
| 3,056,131 | 9/1962 | McCreary. | |
| 3,064,534 | 11/1962 | Tumavicus | 88—84 |

FOREIGN PATENTS

| | | |
|---|---|---|
| 1,048,681 | 8/1953 | France. |
| 1,145,474 | 5/1957 | France. |
| 1,214,783 | 11/1959 | France. |
| 731,831 | 1/1943 | Germany. |

OTHER REFERENCES

"Cooking With an Umbroiler," article and picture in "The Washington Post," October 17, 1956, page 1.

JEWELL H. PEDERSEN, *Primary Examiner.*

D. J. HOFFMAN, W. L. SIKES, *Assistant Examiners.*